United States Patent [19]
Panusopone et al.

[11] Patent Number: 6,122,014
[45] Date of Patent: Sep. 19, 2000

[54] MODIFIED CHROMA KEYED TECHNIQUE FOR SIMPLE SHAPE CODING FOR DIGITAL VIDEO

[75] Inventors: Krit Panusopone; Xuemin Chen, both of San Diego, Calif.

[73] Assignees: Motorola, Inc., Schaumburg, Ill.; General Instrument Corporation, Horsham, Pa.

[21] Appl. No.: 09/156,790

[22] Filed: Sep. 17, 1998

[51] Int. Cl.$^7$ ..................................... H04N 9/74
[52] U.S. Cl. ..................... 348/592; 348/414; 348/420; 348/422; 348/590; 348/585; 348/597
[58] Field of Search ................... 348/585, 586, 348/587, 590, 591, 592, 593, 595, 597, 684, 700, 701, 405, 414, 420, 422, 437, 401, 572, 574; 382/232, 235, 251, 253; 345/114, 441; H04N 9/74

[56] References Cited

U.S. PATENT DOCUMENTS

| | | | |
|---|---|---|---|
| 4,496,966 | 1/1985 | Hausdorfer | 348/587 |
| 5,381,184 | 1/1995 | Gehrman | 348/586 |
| 5,384,912 | 1/1995 | Ogrinc | 395/164 |
| 5,455,633 | 10/1995 | Gehrman | 348/587 |
| 5,502,482 | 3/1996 | Graham | 348/700 |
| 5,644,365 | 7/1997 | Gehrman | 348/590 |
| 5,841,377 | 11/1998 | Takamizawa | 341/51 |
| 5,963,257 | 10/1999 | Katata | 348/415 |
| 5,974,172 | 10/1999 | Chen | 382/166 |

OTHER PUBLICATIONS

Chen, Tsuhan et al., "An Approach to Region Coding for Content–Based Scalable Video," Proceedings of the International Conference on Image Processing (ICIP), U.S., New York, IEEE, pp. 399–402, XP000704058 ISBN:0-7803-3259-8.

Ostermann, Jörn, "Methodologies used for evaluation of video tools and algorithms in MPEG–4," *Signal Processing Image Communication*. Elsevier Science B.V., 1997, vol. 9, No. 4, pp. 343–365.

Ostermann, Jörn et al., "Coding of Arbitarily Shaped Video Objects in MPEG–4," Proceedings, International Conference on Image Processing, Jul., 1997, pp. 496–499.

ITU–T Study Group 16, Contribution 999, Draft Text of Recommendation H.263 Version 2 ("H.263+") for Decision, Annex L.14, "Chroma Keying Information", Sep. 1997.

T. Chen et al., "Improved Chroma–Key Shape Representation," ISO/IECJTC1/SC29/WG11, MPEG97/2490, Jul. 1997.

T. Chen et al., "Coding of subregions for content–based scalable video," IEEE Transactions on Circuits and Systems for Video Technology, vol. 7, No. 1, pp. 256–260, Feb. 1997.

*Primary Examiner*—Mark R. Powell
*Assistant Examiner*—Wesner Sajous
*Attorney, Agent, or Firm*—Barry R. Lipsitz; Ralph F. Hoppin

[57] ABSTRACT

An efficient chroma key-based coding technique for digital video with an optimized switching threshold. An optimized binary keying threshold is provided for switching between a first image region (such as a background region) and second image region (such as a foreground object) video picture. The threshold optimizes a PSNR of a quantization error Q of a key color K. A chroma key technique is also provided for representing the shape of a video object, where the shape information (alpha plane) of a foreground object is embedded in the keyed output, so there is no need to carry an explicit alpha plane, or use alpha plane coding. The chroma key shape representation technique provides a smooth transition at the boundary between objects without the need for special switching patterns, such as a general gray scale shape coding tool, or post-processing, e.g., using feathering filters.

32 Claims, 12 Drawing Sheets

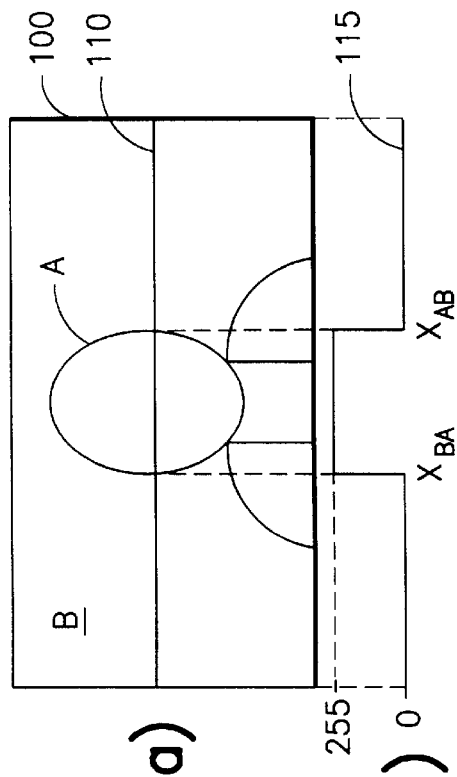
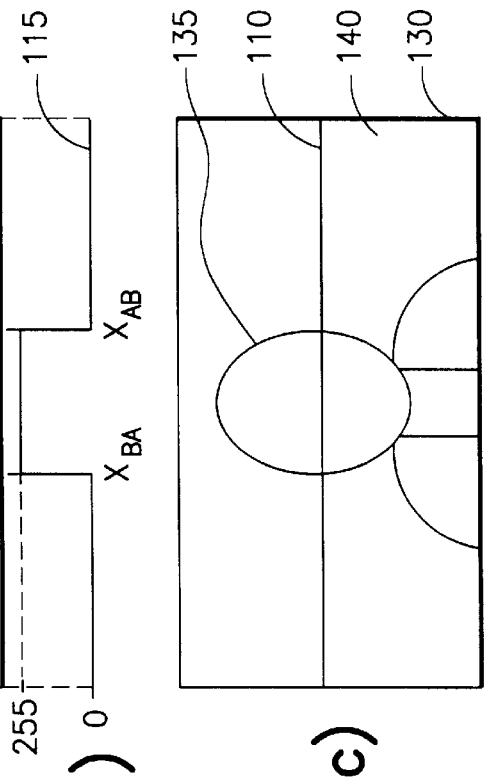
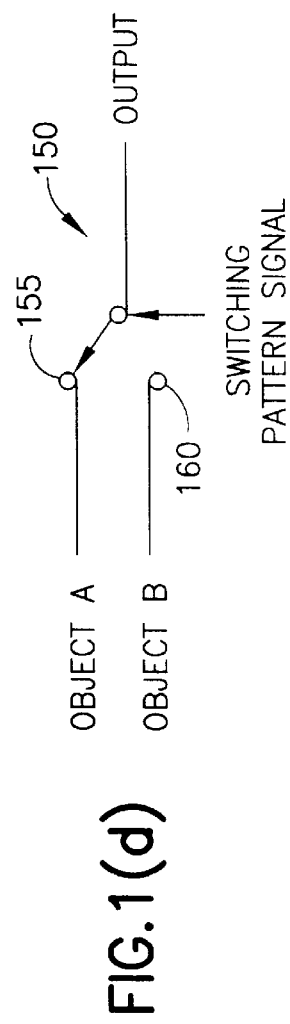
FIG.1(a)
FIG.1(b)
FIG.1(c)
FIG.1(d)

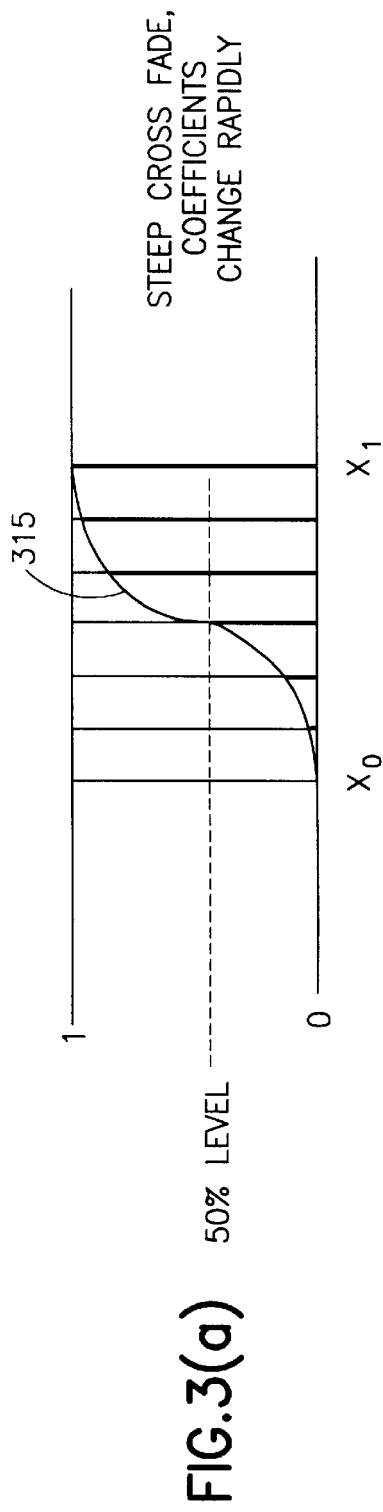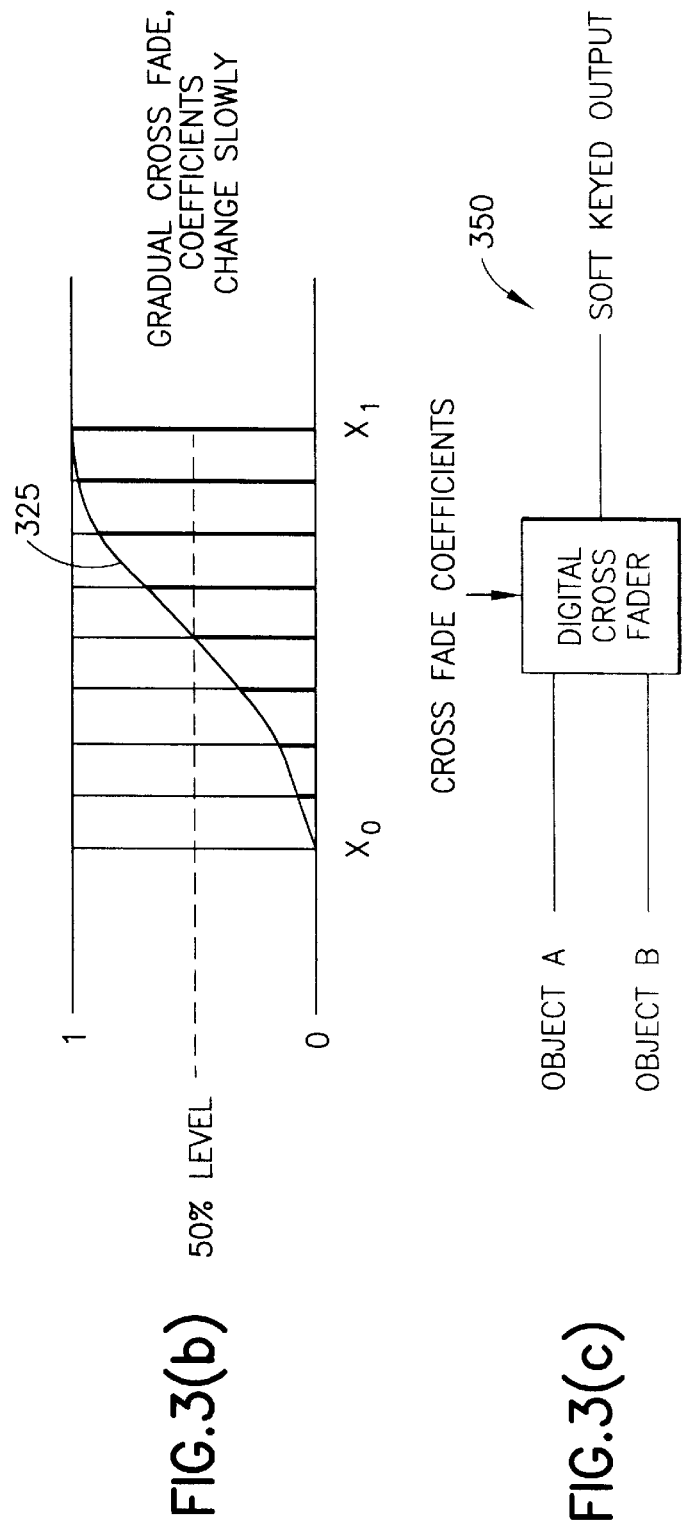
FIG.3(a) FIG.3(b) FIG.3(c)

MODIFIED CHROMA KEYED TECHNIQUE FOR SIMPLE SHAPE CODING FOR DIGITAL VIDEO

BACKGROUND OF THE INVENTION

The present invention relates to a method and apparatus for efficient chroma key-based coding for digital video with an optimized switching threshold.

Object manipulation is one of the desirable features for multimedia applications. This functionality is available in the developing digital video compression standards, such as H.263+ and MPEG-4. For H.263+, refer to ITU-T Study Group 16, Contribution 999, Draft Text of Recommendation H.263 Version 2 ("H.263+") for Decision, September 1997, incorporated herein by reference. For MPEG-4, refer to ISO/IEC 14496-2 Committee Draft (MPEG-4), "Information Technology—Coding of audio-visual objects: visual," October 1997, incorporated herein by reference.

MPEG-4 uses a shape coding tool to process an arbitrarily shaped object known as a Video Object Plane (VOP). With shape coding, shape information, referred to as alpha planes, is obtained. Binary alpha planes are encoded by modified Content-based Arithmetic Encoding (CAE), while grey-scale alpha planes are encoded by a motion compensated Discrete Cosine Transform (DCT), similar to texture coding. An alpha plane is bounded by a rectangle that includes the shape of the VOP. The bounding rectangle of the VOP is extended on the right-bottom side to multiples of 16×16 blocks, and the extended alpha samples are set to zero. The extended alpha plane is partitioned into blocks of 16×16 samples (e.g., alpha blocks) and the encoding/decoding process is performed on each alpha block.

However, such a shape coding tool is complex and not suitable for use in a low bit rate environment. Specifically, the processing and transmission of explicit alpha plane data consumes computational resources and channel bandwidth.

Accordingly, it would be desirable to provide a system for encoding shape information of VOPs and other video objects that does not require the use of explicit alpha planes.

Chroma key-based coding is a simpler alternative for processing video objects, and requires significantly less processing effort and overhead than shape coding, especially in the encoder. Currently, this particular technique is included in H.263+.

Keying is a process where one video signal is mixed into another to replace part of a frame (e.g., picture) or field with a different image. For example, in a news broadcast, a foreground video object such as an announcer's head and upper body may be overlaid on a background object, such as a neutral-colored backdrop. To achieve the effect that the announcer is actually in front of the backdrop, the displayed image must switch between the foreground object and the background object during each horizontal scan line on a television screen.

Such an effect can be achieved by a switch that wipes from one input to another using one of a variety of different switching patterns. For example, a binary switching pattern may be used, wherein the displayed image abruptly transitions from one image to another in a step change. Alternatively, soft keying techniques may be used, where the switching occurs in a relatively gradual ramp-like manner such that a blended or cross-fade region is created between the two different images.

Soft keying generally provides a more realistic effect than binary switching. However, image features may be attenuated or lost if the blending region is too large.

Moreover, difficulties arise in determining a color difference threshold for switching. If the threshold is too high or too low, switching between the backdrop image and the foreground image will not occur at the proper time.

Accordingly, it would be desirable to provide a chroma keying system that provides an optimized threshold for switching between background and foreground objects in a video picture (e.g., frame).

The chroma keying system should be compatible with existing video standards such as MPEG-4 and H.263+, and other frame-based video compression standards including MPEG-2.

The chroma keying system should be computationally efficient and use minimal overhead.

The chroma keying system should be compatible with VOPs and other video objects and images.

It would further be desirable to provide a chroma key technique to represent the shape of a video object, where the shape information (alpha plane) of a foreground object is embedded in the keyed output, so there is no need to carry an explicit alpha plane, or use alpha plane coding.

The chroma key shape representation technique should provide a smooth transition at the boundary between objects without the need for special switching patterns, such as a general gray scale shape coding tool, or post-processing, e.g., using feathering filters.

Moreover, the chroma key technique should work in conjunction with any frame-based compression standard using a minimal overhead.

The chroma key technique should be compatible with constant or variable rate encoding.

The chroma keying technique should provide an encoder which pre-processes key color data (e.g., prior to encoding) for subsequent use in determining an optimum keying threshold. The chroma keying technique should alternatively provide an encoder which determines an optimum keying threshold in real-time (e.g., as an image is encoded).

The present invention provides a chroma keying system having the above and other advantages.

SUMMARY OF THE INVENTION

The present invention relates to a method and apparatus for an efficient chroma key-based coding system for digital video with an optimized switching threshold.

A chroma keying method for encoding a transition between a first image region (such as a background region) and a second image region (such as a foreground object) in a line of a digital video picture is presented. The method includes the step of cross fading pre-encoded key color data (K) of the background region with color data of the foreground object according to alpha plane information of the foreground object to obtain a soft keyed output. The soft keyed output is encoded according to a first quantization parameter (QP) to obtain an encoded soft keyed output.

The method includes the further steps of: coding and decoding the pre-encoded key color data to obtain decoded key color data; calculating a quantization error (Q) of the decoded key color data; and determining an optimum keying threshold (T) according to the first quantization parameter (QP) and the quantization error (Q).

In a real-time embodiment, the coding and decoding of the pre-encoded key color data is responsive to the first quantization parameter (QP) used in the encoding step.

In a pre-processing embodiment, a range of quantization errors of the decoded key color data is calculated according to a corresponding range of quantization parameters; and data indicative of the range of quantization errors and the corresponding range of quantization parameters is stored, e.g., in a look-up table. The determination of the optimum keying threshold (T) is responsive to the stored data. In particular, the calculating and storing steps occur before the encoding of the soft keyed output. Thus, the data indicative of the range of quantization errors and the corresponding range of quantization parameters can be immediately accessed as the soft keyed output is encoded according to the specific QP used at the encoder.

The method includes the further steps of: transmitting the encoded soft keyed output, optimum keying threshold (T), and the pre-encoded key color data (K) across a communication channel to a decoding function; decoding the encoded soft keyed output to obtain a reconstructed soft keyed output; and recovering decoded alpha plane data and object pixel data of the foreground object from the reconstructed soft keyed output in accordance with the optimum keying threshold (T) and the pre-encoded key color data (K).

The recovering step may include the step of dividing the reconstructed soft keyed output into the pre-encoded key color data (K) by thresholding with the optimum keying threshold (T) to obtain the decoded alpha plane data a and object pixel data YUV for the foreground object. Specifically, a distance between the reconstructed soft keyed output and the encoded key color data (K) is determined. The reconstructed soft keyed output is classified as the foreground object if the distance is greater than the optimum keying threshold (T). Or, the reconstructed soft keyed output is classified as the background image region if the distance is not greater than (T).

Advantageously, the alpha plane information of the foreground object is embedded in the soft keyed output of the foreground object.

The method is equally suitable for use in encoding a transition between a foreground object and a background region.

Additionally, the optimum keying threshold (T) is determined in the determining step by observing a measure of the quantization error (Q) for a range of keying thresholds at the first quantization parameter (QP). The measure may be a peak signal-to-noise (PSNR) ratio of the pre-encoded key color data (K) to the quantization error (Q). In particular, the optimum keying threshold (T) is found at the lowest value of T where a rapid increase in PSNR is observed.

A chroma keying decoding method is also presented. The method includes the step of receiving an encoded soft keyed output from a communication channel; where the encoded soft keyed output is obtained at an encoder by cross fading pre-encoded key color data (K) of a first image region (such as a background region) with color data of a second image region (such as a foreground object) according to alpha plane information of the foreground object to obtain a soft keyed output, and encoding the soft keyed output according to a first quantization parameter (QP).

Optimum keying threshold data (T) and the pre-encoded key color data (K) are received from the communication channel, where the optimum keying threshold data (T) is obtained at the encoder by coding and decoding the pre-encoded key color data to obtain decoded key color data, calculating a quantization error (Q) of the decoded key color data, and determining the optimum keying threshold data (T) according to the first quantization parameter (QP) and the quantization error (Q).

The encoded soft keyed output is decoded to obtain a reconstructed soft keyed output; and the decoded alpha plane data and object pixel data of the foreground object are recovered from the reconstructed soft keyed output in accordance with the optimum keying threshold (T) and the key color data (K).

The method includes the steps of determining a distance between the reconstructed soft keyed output and the encoded key color data (K), classifying the reconstructed soft keyed output as the foreground object if the distance is greater than the optimum keying threshold (T), or, classifying the reconstructed soft keyed output as the background image region if the distance is not greater than (T).

The method is equally suitable for use in encoding a transition between a foreground object and a background region.

Corresponding apparatus structures are also presented.

BRIEF DESCRIPTION OF THE DRAWINGS

FIG. 1(a) illustrates a video frame with foreground and background video objects and an example video line.

FIG. 1(b) illustrates a binary control signal for the video frame of FIG. 1(a).

FIG. 1(c) illustrates a binary switching pattern for the video frame of FIG. 1(a).

FIG. 1(d) illustrates a binary switch for use with the binary switching pattern of FIG. 1(c).

FIG. 3(a) illustrates a steep cross fade for the alpha plane switching pattern of FIG. 2(c).

FIG. 3(b) illustrates a gradual cross fade for the alpha plane switching pattern of FIG. 2(c).

FIG. 3(c) illustrates a cross fader for use with the alpha plane switching pattern of FIG. 2(c).

DETAILED DESCRIPTION OF THE INVENTION

Figure 2A:
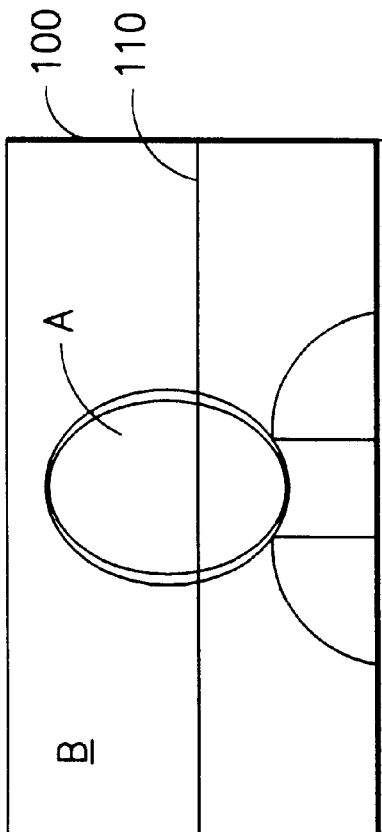
FIG. 2(a) illustrates a video frame with foreground and background video objects and an example video line.

The present invention relates to a method and apparatus for an efficient chroma key-based coding system for digital video with an optimized switching threshold.

FIG. 1(a) illustrates a video frame with foreground and background video objects and an example video line. The term "video object" is used herein to designate any video image, including but not limited to VOPs as used in the MPEG-4 standard, and including rectangular as well as arbitrarily-shaped video images.

As mentioned, keying is a process where one video signal is mixed into another to replace part of a frame or field with a different image. Such an effect can be performed by a switch at a video encoder or decoder that switches from one video image to another using a specified switching pattern.

Generally, one video frame at a time is processed, although it is possible to process sub-frame portions. For example, frame 100 includes a backdrop image B (e.g., first image region) and a foreground image A (e.g., second image region). Of course, while only one foreground image is provided in the present example, any number of overlapping images may be present. At the encoder or decoder, pixel data from both images A and B are available. The image data may have been transmitted to the encoder or decoder over a communication path, such as a cable television, satellite or computer network, for example. Or, either or both of images A and B may be retrieved from a local library of video data.

In a news broadcast, for example, the foreground object (image A) may be an announcer's head and upper body that is obtained real-time, while the backdrop object (image B) may be a neutral backdrop and/or a computer-generated graphic. For example, for weather reports, a graphic of a map is often provided as a backdrop to an announcer who appears to be standing in front of the map but is actually standing in front of a blank wall, such as a solid blue screen. Switching or keying between the two images therefore occurs at an encoder prior to transmitting the composite image to a decoder population.

However, keying may also occur at a decoder under the control of a user. For example, with VOPs as used in the MPEG-4 standard, a user may use a compositor that interfaces with a local video library to act as a video editor by assembling and overlaying VOPs received from a encoder and/or from the library.

An example video line is a horizontal line that extends across the frame 100. The frame may be processed line-by-line, e.g., including a representative line 110. At the top of the frame 100, only pixels from the backdrop B are present so there is no need to switch to another object. However, for video lines that traverse overlapping objects, such as line 110, it is necessary to switch from one object to the other at the appropriate time to obtain the appropriate pixel color information for encoding or display.

For each video line, a binary line is generated such that it has the value "255" (or other constant value between 0 and 255, for example) for pixel positions inside the object A and the value "0" for pixel positions inside the object B. Such binary lines provide control signals for the video switch of FIG. 1(d). All binary lines form the binary switching pattern. Video switching between objects actually takes place during each line of pixels.

FIG. 1(b) illustrates a binary control signal for the video frame of FIG. 1(a). The control signal 115 has two values, e.g., "0" and "255". For the video line 110, the control signal transitions immediately from "0" to "255" at a horizontal pixel coordinate $X_{BA}$ that corresponds to the transition from the background image B to the foreground image A. The control signal remains at "255" for as long as pixel data of the foreground image A is to be output. Similarly, the control signal transitions immediately from "255" to "0" at a horizontal coordinate $X_{AB}$ that corresponds to the transition from the foreground image A to the background image B. The control signal remains at "0" for as long as pixel data of the background image B is to be output.

An appropriate control signal can be generated in many ways. For example, by analyzing color difference signals, it is possible to determine where in a video line a particular color or color difference occurs. When a key signal is generated in this way, the process is known as chroma keying, which is the electronic equivalent of matting in film.

Chroma keying consists of substituting a background signal in place of a foreground signal, or vice-versa, based on some key color identified in the foreground video signal. Chroma keying is also popularly known as the "blue screen", due to frequent choice of a bright blue color for keying in the background signal.

FIG. 1(c) illustrates a binary switching pattern for the video frame of FIG. 1(a). While objects A and B from FIG. 1(a) may each have a variety of colors and patterns, the binary switching pattern 130 of FIG. 1(c) only has an area 135 with values "255" corresponding to object A, and an area 140 with values "0" corresponding to object B. The binary switching pattern 130 provides information for the switching pattern signal for the switch of FIG. 1(d).

FIG. 1(d) illustrates a binary switch for use with the binary switching pattern of FIG. 1(c). The switch 150 outputs pixel data from object A by selecting terminal 155, or from object B by selecting terminal 160, according to the switching pattern in each video line. Specifically, the switch 150 outputs pixel data from object A when the current value of the video line is "255", while pixel data from object B is output when the current value of the video line is "0".

If chroma keying (or other keying) is implemented as a switch within a frame between a foreground and background source, the switching edge must be positioned accurately. Soft keying techniques are often used to produce a more realistic effect than binary switching. In this case, the binary switch 150 is replaced by a cross fader as discussed below.

FIG. 2(a) illustrates a video frame with foreground and background video objects and an example video line. The video frame 100 and example video line 110 correspond to those of FIG. 1(a).

Figure 2B:
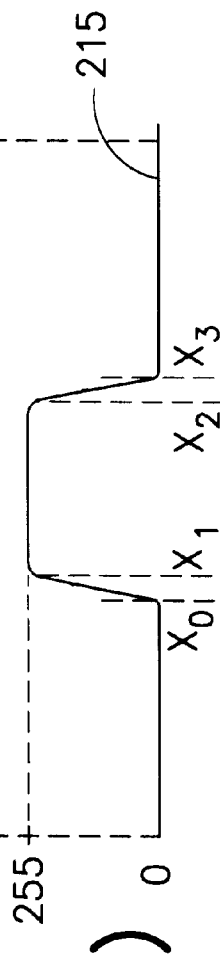
FIG. 2(b) illustrates a cross-fade control signal for the video frame of FIG. 2(a).

FIG. 2(b) illustrates a cross-fade control signal for the video frame of FIG. 2(a). Here, instead of using binary switching between objects A and B in the video line 110, blended switching is used. Near the left edge of the object area A, the control signal 215 transitions from "0" to "255" between horizontal pixels that may be represented by coordinates $x_0$ and $x_1$. Similarly, near the right edge of the object area A, the control signal transitions from "255" to "0" between horizontal pixels that may be represented by coordinates $x_2$ and $x_3$.

Figure 2C:
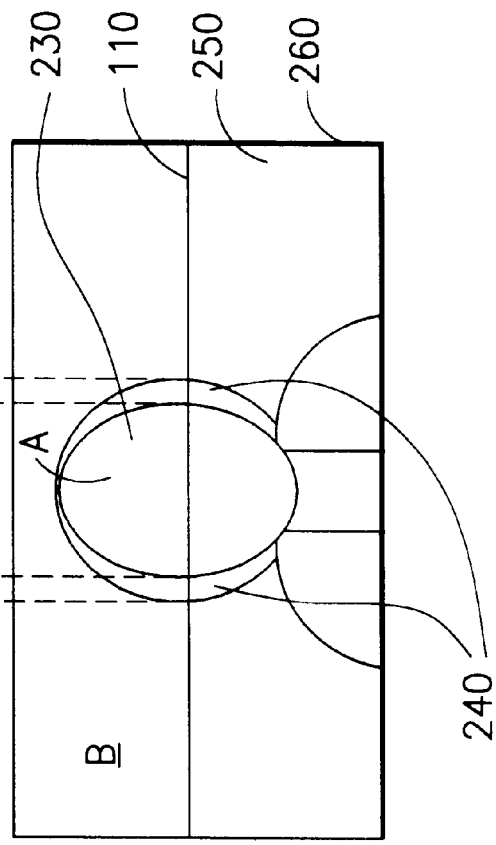
FIG. 2(c) illustrates a blended switching pattern for the video frame of FIG. 2(a).

FIG. 2(c) illustrates a blended switching pattern for the video frame of FIG. 2(a). The alpha (α) plane switching pattern 260 includes an area 230 with value "255" extending between coordinates x1 and $x_2$ at video line 110, a blended area 240 with values between "0" and "255", extending between coordinates $x_0$ and $x_1$, and between coordinates $x_2$ and $x_3$, at video line 110, and an area 250 with value "0" extending outside of the blended area 240. The alpha plane switching pattern 260 is used to provide cross fade coefficients for the digital cross fader of FIG. 3(*c*). The alpha plane switching pattern 260 is a gray level alpha plane which ramps between two objects or images for each horizontal video line.

FIG. 3(*a*) illustrates a steep cross fade for the alpha plane switching pattern of FIG. 2(*c*). A fade from object B at pixel coordinate $x_0$ to object A at pixel coordinate $x_1$ at example video line 110 is shown. Here, the fade extends over seven pixel locations from $x_0$ to $x_1$. For each pixel location, a corresponding cross fade coefficient is determined, ranging from "0" at $x_0$ to "1" at $x_1$. A 50% fade level occurs at a pixel location that is approximately midway between $x_0$ and $x_1$. A curve 315 can be fitted to the coefficient values.

FIG. 3(*b*) illustrates a gradual cross fade for the alpha plane switching pattern of FIG. 2(*c*). Again, a fade from object B at pixel coordinate $x_0$ to object A at pixel coordinate $x_1$ at example video line 110 is shown. Here, the fade is more gradual than in FIG. 3(*a*) since it extends over nine pixel locations from $x_0$ to $x_1$. A curve 325 can be fitted to the coefficient values.

FIG. 3(*c*) illustrates a cross fader for use with the alpha plane switching pattern of FIG. 2(*c*). The cross fader 350 receives cross fade coefficients, e.g., from FIG. 3(*a*) or FIG. 3(*b*), along with the object A and B pixel data for each video line, and provides a corresponding soft keyed output. The output (out) is characterized by the foreground (object A), the background (object B), and the alpha plane ($\alpha$) as:

out=($\alpha$)(object A)+(1−$\alpha$)(object B).

In accordance with the present invention, a chroma key technique is used to represent the shape of a video object. Moreover, the shape information (alpha plane) of the foreground is embedded in the keyed output, so there is no need to carry an explicit alpha plane, or use alpha plane coding, e.g., as used in the shape coding tool of MPEG-4. Accordingly, significant computational efficiencies result since alpha plane data does not have to be calculated at an encoder and transmitted across a channel to a decoder.

Furthermore, the chroma key shape representation technique of the present invention provides a smooth transition at the boundary between objects without the need for special switching patterns, such as a general gray scale shape coding tool, or post-processing, e.g., using feathering filters. Moreover, the chroma key technique can work in conjunction with any frame-based compression standard using a minimal overhead. The chroma key technique also reduces the complexity of the decoder by simplifying the motion compensation process in the background area.

Chroma key shape coding for a simple shape coding tool is now discussed. This tool has two subsystems.

In a first subsystem, improved chroma key shape representation is provided. The main purpose of this subsystem is to reconstruct the alpha plane based on the keyed output. For a given object, the keyed output is created by padding the area on the boundary macroblock outside the object with the key color K. Decompressed texture data (e.g., DCT coefficients) is used to recover shape information based on a distance d, e.g. the Euclidean distance between the decoded pixel (X) and the key color (K). Each pixel X is represented by three components, namely a luminance component X(Y), and chrominance components X(Cr) and X(Cb).

Figure 4:
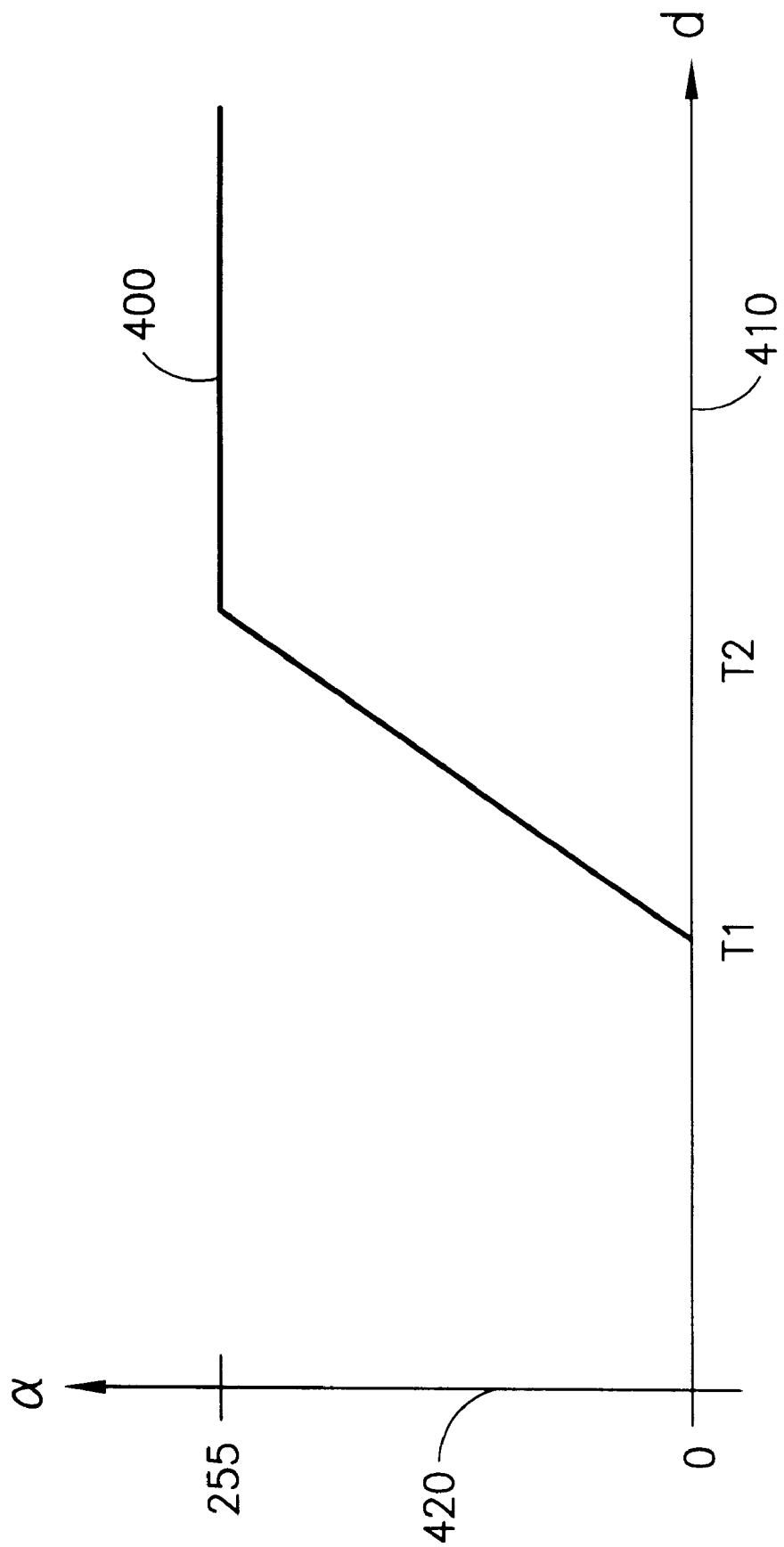
FIG. 4 illustrates a relationship between an alpha plane value and a Euclidean distance d between a decoded pixel color and a key color K.

The reconstructed alpha plane is then calculated for each pixel based on the following criteria:

if (d<T1) then a=0, else if (T1<d<T2) then $\alpha$=((d−T1)/(T2−T1))×255, else if (d>T2) then $\alpha$=255, where d=(K(Y)−X(Y))$^2$+(K(Cb)−X(Cb))$^2$+(K(Cr)−X(Cr))$^2$, and Y, Cb, and Cr represent the color space. Moreover, T1 and T2 are lower and upper keying thresholds, respectively, as discussed below. The relationship between the distance and the reconstructed alpha plane values is shown in FIG. 4.

The squared Euclidean distance d is just one example of distance measure. Chroma key shape coding can select other measures such as absolute distance or Hamming distance which are better in the sense of saving computations. Absolute distance is defined as:

D$_{abs}$=|K(Y)−X(Y)|+|K(Cb)−X(Cb)|+|K(Cr)−X(Cr)|

Hamming distance is the number of coordinates in which the two inputs differ and is calculated as follows:

D$_{Hamming}$(Y)=|{i|K(Y)$_i$≠X(Y)$_i$,i=0,1, . . . ,n-1}|

D$_{Hamming}$(Cb)=|{i|K(Cb)$_i$≠X(Cb)$_i$,i=0,1, . . . ,n-1}|

D$_{Hamming}$(Cr)=|{i|K(Cr)$_i$≠X(Cr)$_i$,i=0,1, . . . ,n-1}|

Any other suitable distance measure may be used.

FIG. 4 illustrates a relationship between (a) an alpha plane value, and (b) a Euclidean distance d between a decoded pixel color and a key color K. Values for the Euclidean distance extend along $\alpha$ horizontal axis 410, while values for a extend along a vertical axis 420.

Note that, if T1=T2, the alpha plane will be binary. Hence, there is no effect, e.g., no transitional pattern. A key color K with components Y=135, Cb=160, and Cr=110, and threshold values of T1=60 and T2=70 have been suggested in T. Chen, A. Puri and R. L. Schmidt, "Improved Chroma-Key Shape Representation," ISO/IEC JTC1/SC29/WG11 MPEG97/2490, July 1997.

In a second subsystem of the coding tool, chroma key-based shape coding is provided. Chroma key shape representation can be easily integrated into existing shape coding tools, such as used in MPEG-4. Color key and threshold information have to be added in the system syntax. Coding is performed only inside the bounding box since, what is referred to as "intelligent VOP formation" in the MPEG-4 standard (section 3.1.1. "VOP formation") is known for each VOP. Moreover, processing in all background macroblocks follows one of three schemes, namely inter mode (using motion compensation), intra mode (using DC prediction), or skipping mode (using the reference macroblock). For motion compensation, the reference frame is padded with the key color using the reconstructed previous shape. The residual and intra macroblocks are coded and decoded as in MPEG-4.

However, a number of problems arise with these two subsystems. First, there is no protection against systematic compression errors, such as errors caused by a quantization errors of transformed coefficients, e.g., DCT coefficients. For example, a background color close to an object boundary is usually close to the object texture inside (e.g., on the other side of) the boundary as a result of quantization error of DCT coefficient, and can shift the boundary further in the object.

Second, the reconstructed alpha plane may not follow the original alpha plane since there is no guarantee that object texture in the transition or keyed region has the same characteristic. Moreover, the threshold range has to be wide enough to respond to the randomness of the texture. However, as the threshold widens, the texture inside the object may be attenuated or destroyed if the distance of the object is not sufficiently larger than that of the transition region. Thus, the features of the object may not be visible if the transition region is too large.

Specifically, the present inventors have observed that the cross fading effect is generated when using a big gap between T1 and T2, for example, T1<100 and T2>10,000. Unfortunately, the inside alpha object will be corrupted with these threshold values. In contrast, a small threshold gap produces only a binary transition. Nevertheless, the final output after blending with the reconstructed alpha plane is more accurate than when a large threshold gap is used.

The present inventors have observed that there is essentially no connection between alpha and texture information. It is therefore not reliable to generate alpha planes from the texture data. Based on experiments discussed below, it has been determined that a binary transition that determines the boundary of the object precisely provides the optimum result in terms of a high PSNR. Thus, if the chroma key process concentrates on locating the accurate boundary, only a single optimum threshold is required. This simplifies the encoding process. Moreover, the complexity at the decoder also decreases because the criteria for alpha calculation involves only one comparison instead of a multiple comparisons and possibly a division (e.g., there is a division in the equation above, "$\alpha=((d-T1)/(T2-T1))\times 255$").

However, the result of this processing does not include any information about the alpha plane at the transition between objects. Accordingly, a modified chroma key technique is provided wherein the useful alpha information is embedded in the keyed output. A complete shape coding system in accordance with the present invention includes the chroma key-based shape coding technique with a modification, as follows.

The encoder sends the soft keyed output from the cross fader to create a transition between the boundary and an object. It is evident that the chroma key technique can use T=0 to obtain an optimal (e.g., highest PSNR, or best quality) final output as long as there is no coding error. In a realistic scenario, the decoded output will not be the same as the soft keyed output and the chroma key shape coding will generate an error. Fundamentally, the error comes from two sources, (1) quantization error of the key color, and (2) color bleeding into the background. These errors are illustrated in FIGS. 5(a) and 5(b).

Figure 5A:
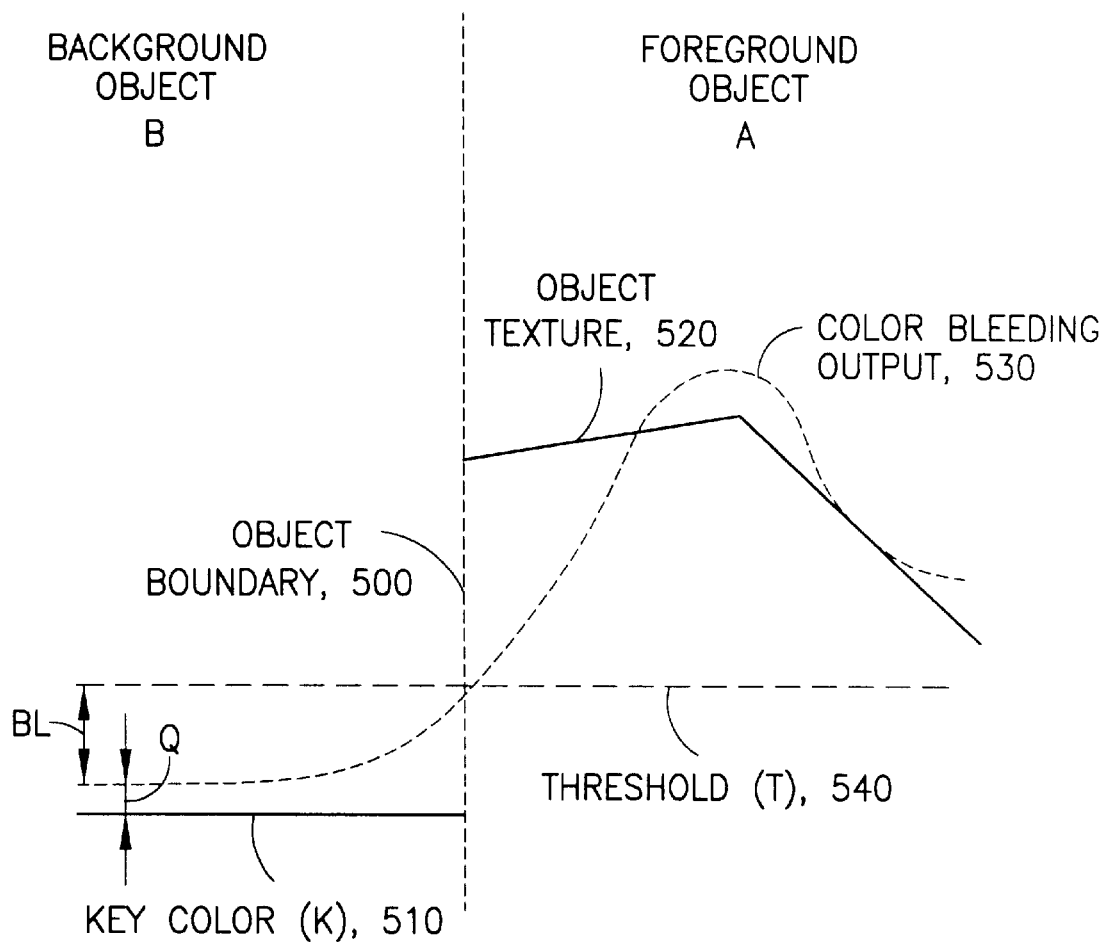
FIG. 5(a) illustrates embedded alpha information in a keyed color output with object texture of a foreground object in accordance with the present invention.
Figure 5B:
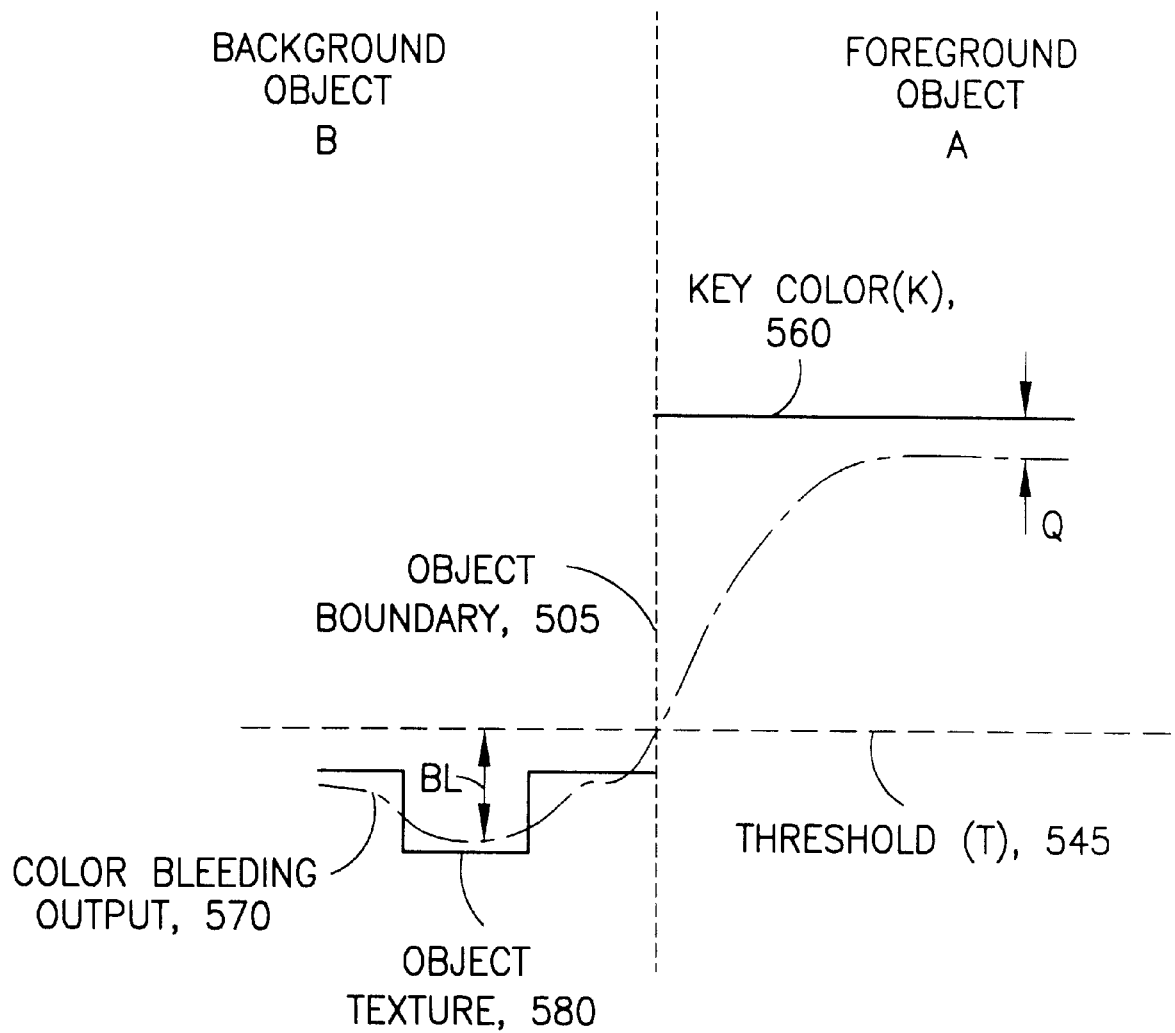
FIG. 5(b) illustrates embedded alpha information in a keyed color output with object texture of a background object in accordance with the present invention.

FIG. 5(a) illustrates embedded alpha information in a keyed color output with object texture of a foreground object in accordance with the present invention. A foreground object A and a background object B are separated by an object boundary 500. A quantization error Q of the key color 510 for the background object A is shown, along with a color bleeding output 530 (e.g., soft keyed output), an object texture 520, and a threshold (T) 540 which indicates the crossing point of the object boundary 500 and the color bleeding output 530. Note that there is an object texture and key color for both objects A and B. FIG. 5(b) shows the object texture for object B and the key color for object A.

Assuming the key color is at the minimum possible in the color coordinate, the optimum threshold with the coding error must be higher than the maximum decoded key color and lower than the minimum decoded texture of the inside object, e.g., foreground object A. Note that the term "object" is commonly used to refer to a foreground object, while a background object is often referred to simply as a background. The general term "image region" may also be used.

It is possible to calculate the quantization error Q of the key color by comparing the key color of the reconstructed input with the original key color. Unfortunately, it is not practical to find the amount of color bleeding (BL) because it is content-dependent. The maximum decoded key color is then max(K)=K+Q+max(BL), where max(K) is preferably fixed at the threshold (T) 540.

FIG. 5(b) illustrates embedded alpha information in a keyed color output with object texture of a background object in accordance with the present invention. Here, the object texture 580 of the background object B, and the key color 560 of the foreground object A are shown. A quantization error Q of the key color 560 for the background object B is shown, along with a color bleeding output 570 (e.g., soft keyed output), and the threshold (T) 545 which indicates the crossing point of the object boundary 505 and the color bleeding output 570. The amount of color bleeding (BL) for the background object B is also shown.

Figure 6A:
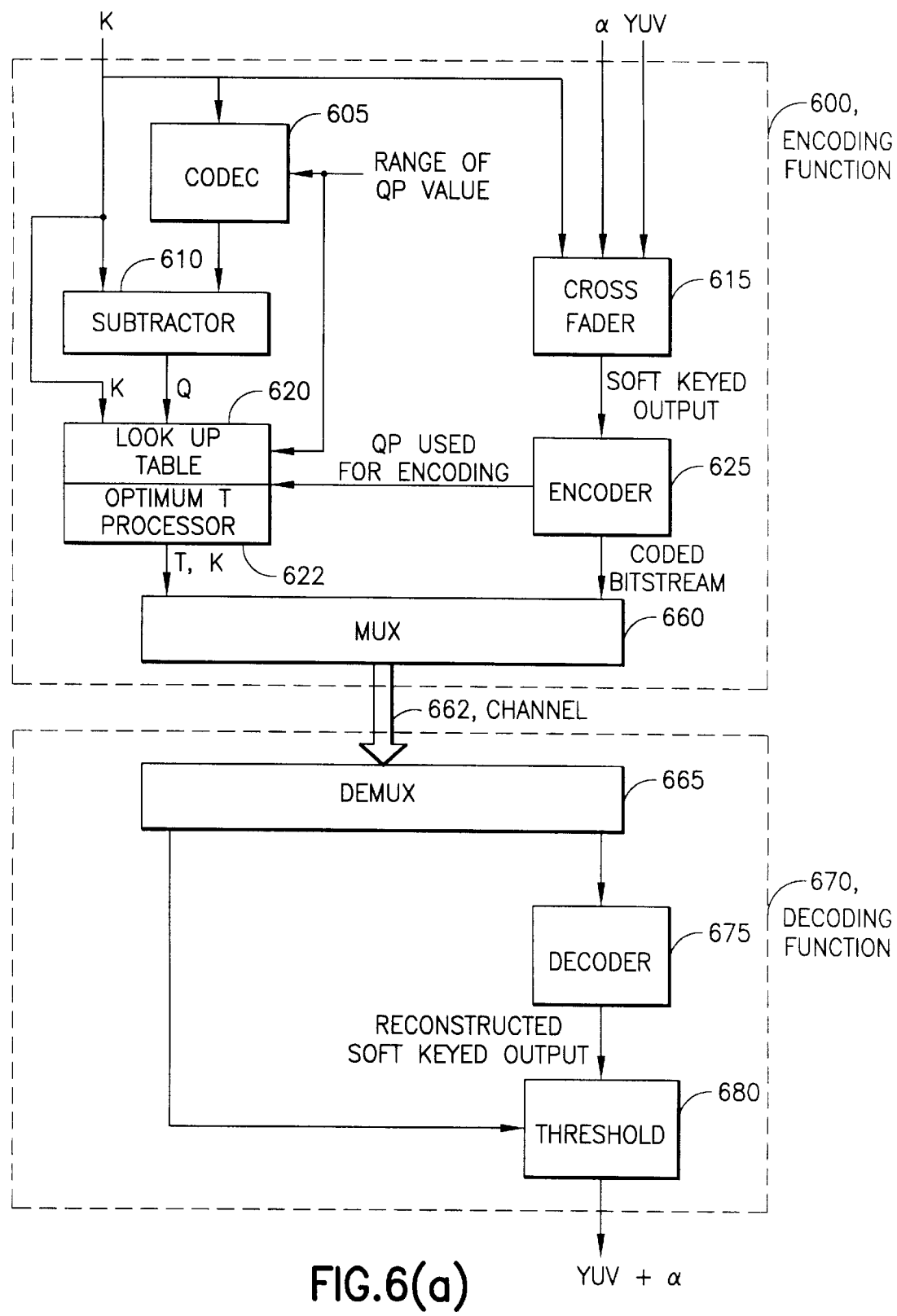
FIG. 6(a) illustrates an encoding function with pre-processing for a look-up table, and a decoding function in accordance with the present invention.

FIG. 6(a) illustrates an encoding function with pre-processing for a look-up table, and a decoding function in accordance with the present invention. The encoding function 600 receives a pre-encoded key color data K, alpha plane data $\alpha$, and object pixel data YUV.

In a pre-processing step, prior to encoding the foreground and background image data for transmission to a decoder, a range of quantization errors Q of the key color K is calculated by coding and decoding K at a codec 605 with a range of quantization parameters QP. A subtractor 610 receives the quantized K output from the codec 605 along with the unquantized K to calculate the quantization error Q for each QP. A look-up table 620 stores the range of QP and the corresponding range of Q. Separate look-up table entries may be provided for each color component of K, e.g., Y, Cr and Cb.

Note that instead of using a look-up table, the relationship between the range of QP and the corresponding range of Q may be expressed in equation form using any known curve fitting scheme. In this case, only the coefficients of the equation need be stored.

After the look-up table 620 has been established, encoding of the foreground and background objects may occur. At a cross fader 615, digital cross fading of the key color K with the foreground object based on the object's alpha information is performed to provide a soft keyed output to the encoder 625. The encoder 625 may use the MPEG-2, MPEG-4 or H.263+ standards, for example, to encode the soft keyed output with a desired QP level to obtain an encoded bitstream. The desired QP level may be varied to maintain a constant bit rate at the output of the encoder 625, or a fixed QP may be used, in which case the bit rate of the encoder 625 will vary. One possible scenario for a constant bit rate is to fix the QP for all background macroblocks at some constant value (e.g., 31) and adjusting QP for the foreground macroblock following the rate control mechanism.

The QP value used at the encoder 625 for a encoding a particular image area, e.g., macroblock or other region in which the same QP is used, is provided to the look-up table 620 to determine the corresponding value of Q. Next, at an optimum T processor 622, an optimum T is determined as a function of K and Q. Specifically, a PSNR is determined based on K/Q for different values of T. An optimal T results in a relatively high PSNR at a relatively low T, as discussed further in connection with FIGS. 8–10. The encoded soft keyed output (e.g., coded bitstream), T and K are provided to a multiplexer (MUX) 660 and transmitted across a channel 662, such as a cable television plant, satellite network or other link.

In fact, it is also possible to perform the pre-processing step at the decoder in the identical manner as the process that is described before. In this case, the decoder will determine the T by itself based on the knowledge of the current QP.

At the decoding function 670, The encoded soft keyed output, T and K are received at a demultiplexer (DEMUX) 665, and the coded bitstream is decoded at a decoder 675 using the standard that was used by the encoder 625 to obtain a reconstructed soft keyed output. At a threshold function 680, the reconstructed soft keyed output (comprising the alpha embedded foreground object data and the key color background) is classified as the foreground object or region if the distance between the reconstructed soft keyed output and the key color received from the DEMUX 665 is greater than the threshold T. If this distance is not greater than the threshold T, the reconstructed soft keyed output is classified as the background object or region.

Extensive simulations have been run with chroma key shape coding using MPEG-4 I-VOP texture coding to verify the present technique.

Figure 6B:
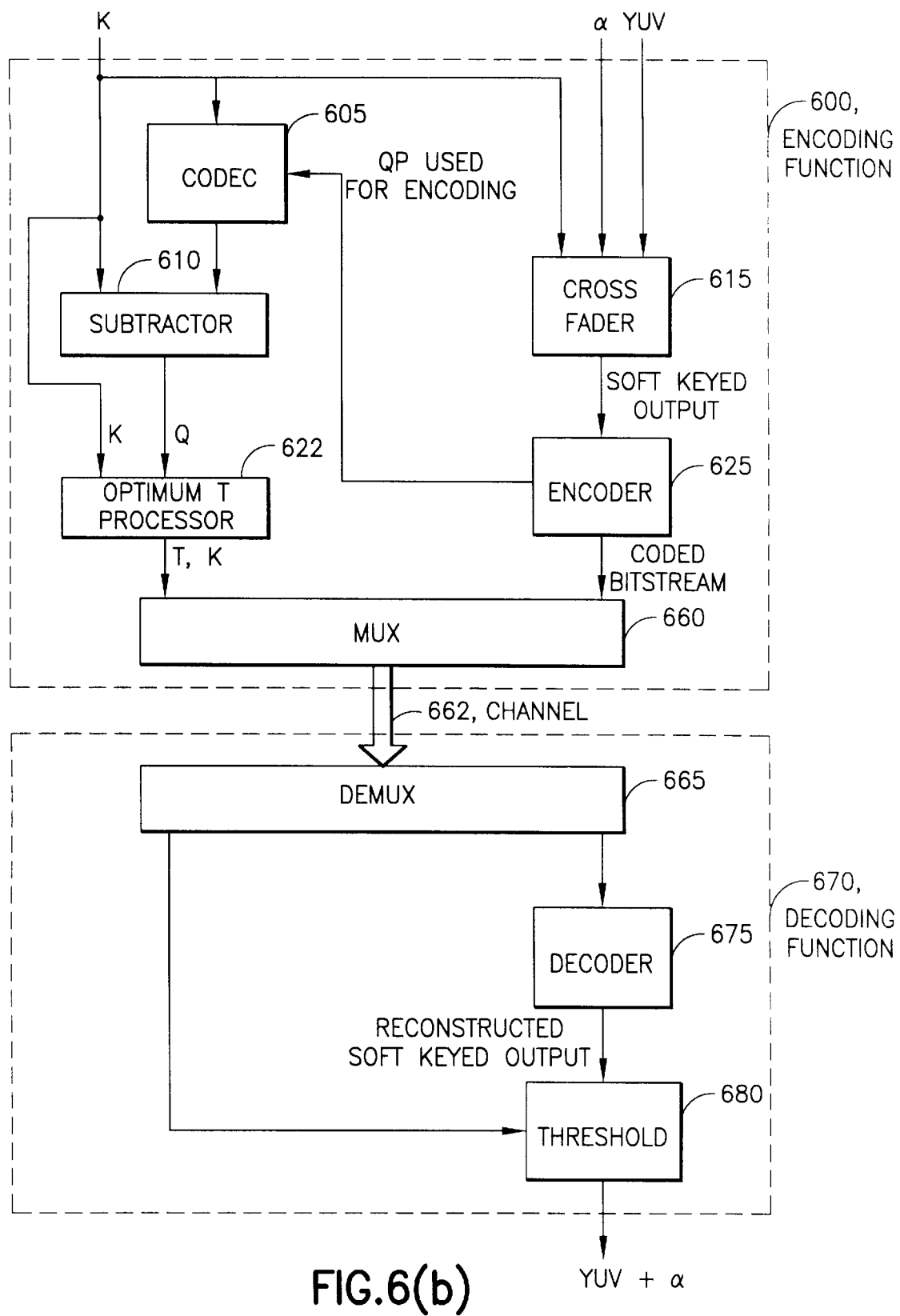
FIG. 6(b) illustrates an encoding function with real-time processing, and a decoding function in accordance with the present invention.

FIG. 6(*b*) illustrates an encoding function with real-time processing, and a decoding function in accordance with the present invention. Here, the quantization error Q is determined real-time, and there is no look-up table for storing a range of Q values versus QP values. This embodiment avoids the need for the pre-processing of FIG. 6(*a*).

Specifically, the desired QP value used at the encoder 625 is provided to the codec 605 to code and decode K. A corresponding quantization error Q is output from the subtractor 610 and provided to the optimum T processor 622.

Figure 7:
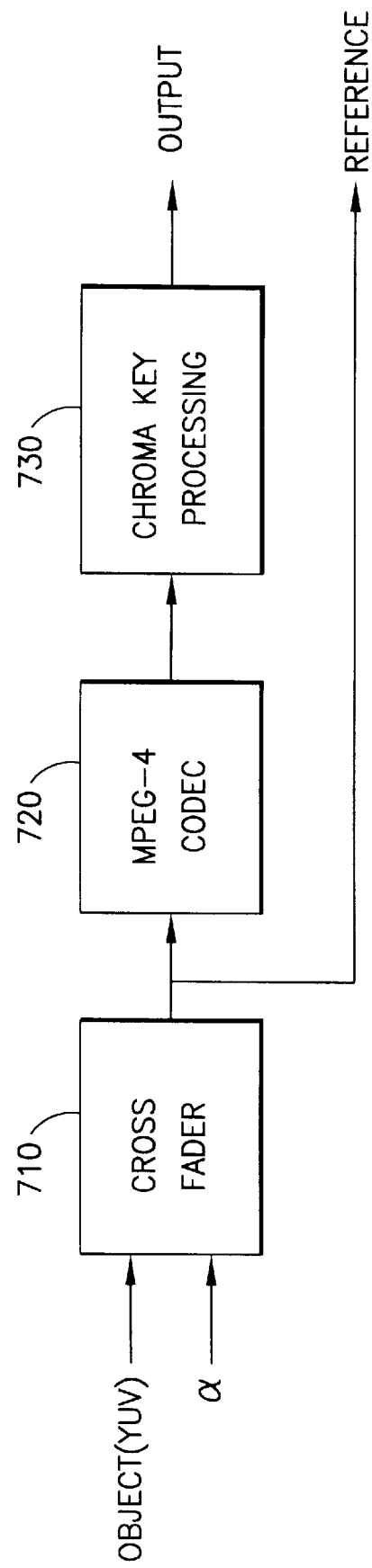
FIG. 7 illustrates a simulation process in accordance with the present invention.

FIG. 7 illustrates a simulation process in accordance with the present invention. Alpha plane data α and object pixel data YUV were provided to a cross fader 710 to obtain soft keyed data, which was used as a reference value and also provided to an MPEG-4 codec 720. The coded bitstream from the codec 720 was provided to a chroma key processing function 730 to obtain an output value for comparison with the reference value.

As set forth in Table 1, a key color of Y=135, Cb=160, Cr=110, and different quantization parameters QP were used in the simulations. Table 1 shows the quantization error Q for a range of quantization parameters. Y', Cb', and Cr' denote values after decoding which may differ slightly from the pre-encoded values.

TABLE 1

| QP  | 5   | 10  | 15  | 20  | 25  | 30  |
|-----|-----|-----|-----|-----|-----|-----|
| Y'  | 135 | 135 | 135 | 137 | 136 | 138 |
| Cb' | 160 | 160 | 159 | 160 | 159 | 159 |
| Cr' | 110 | 110 | 110 | 110 | 109 | 111 |
| Q   | 0   | 0   | 1   | 4   | 3   | 11  |

Figure 8:
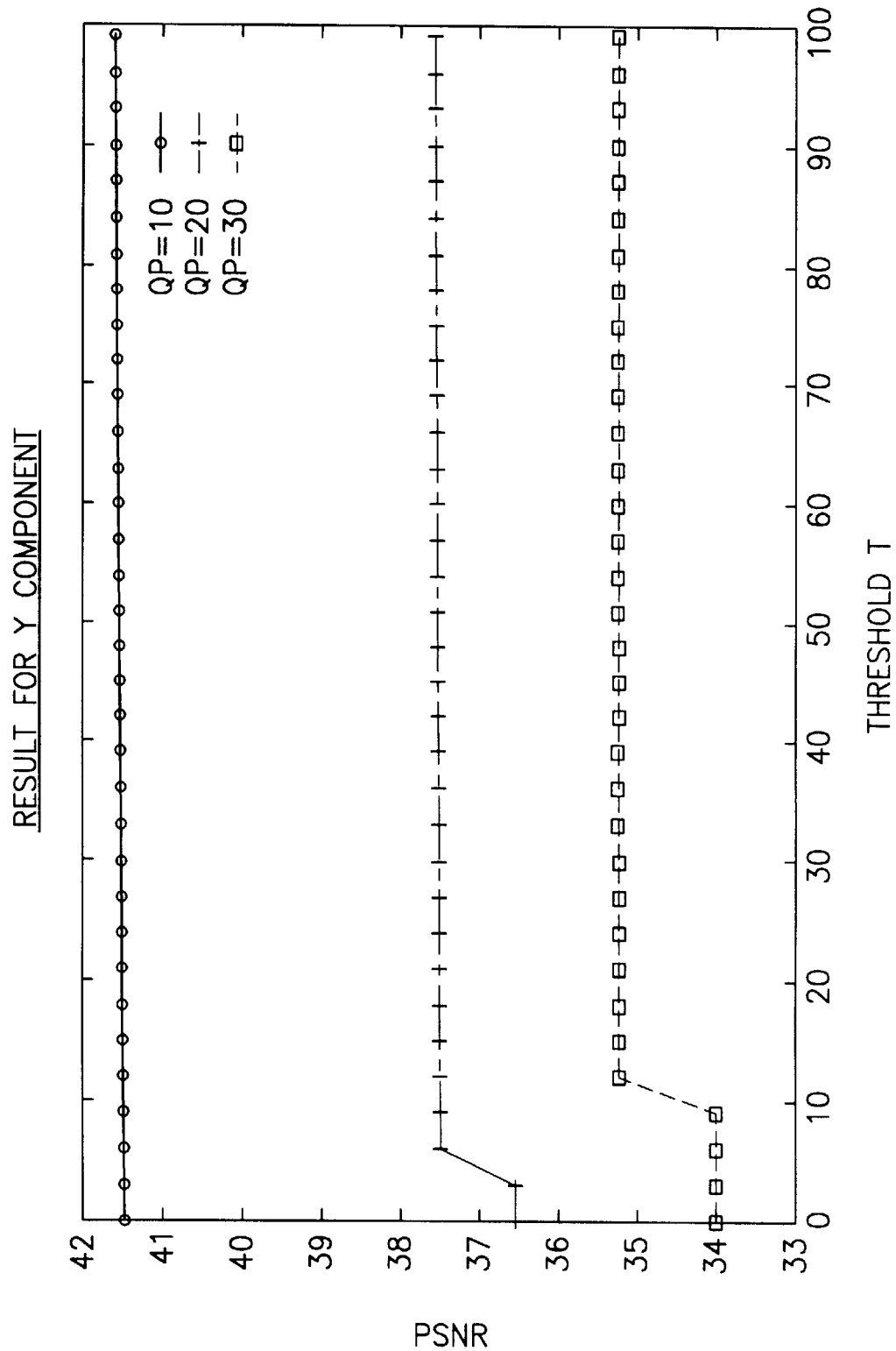
FIG. 8 illustrates simulation results of PSNR versus color threshold for the luminance (Y) component of an object in accordance with the present invention.
Figure 9:
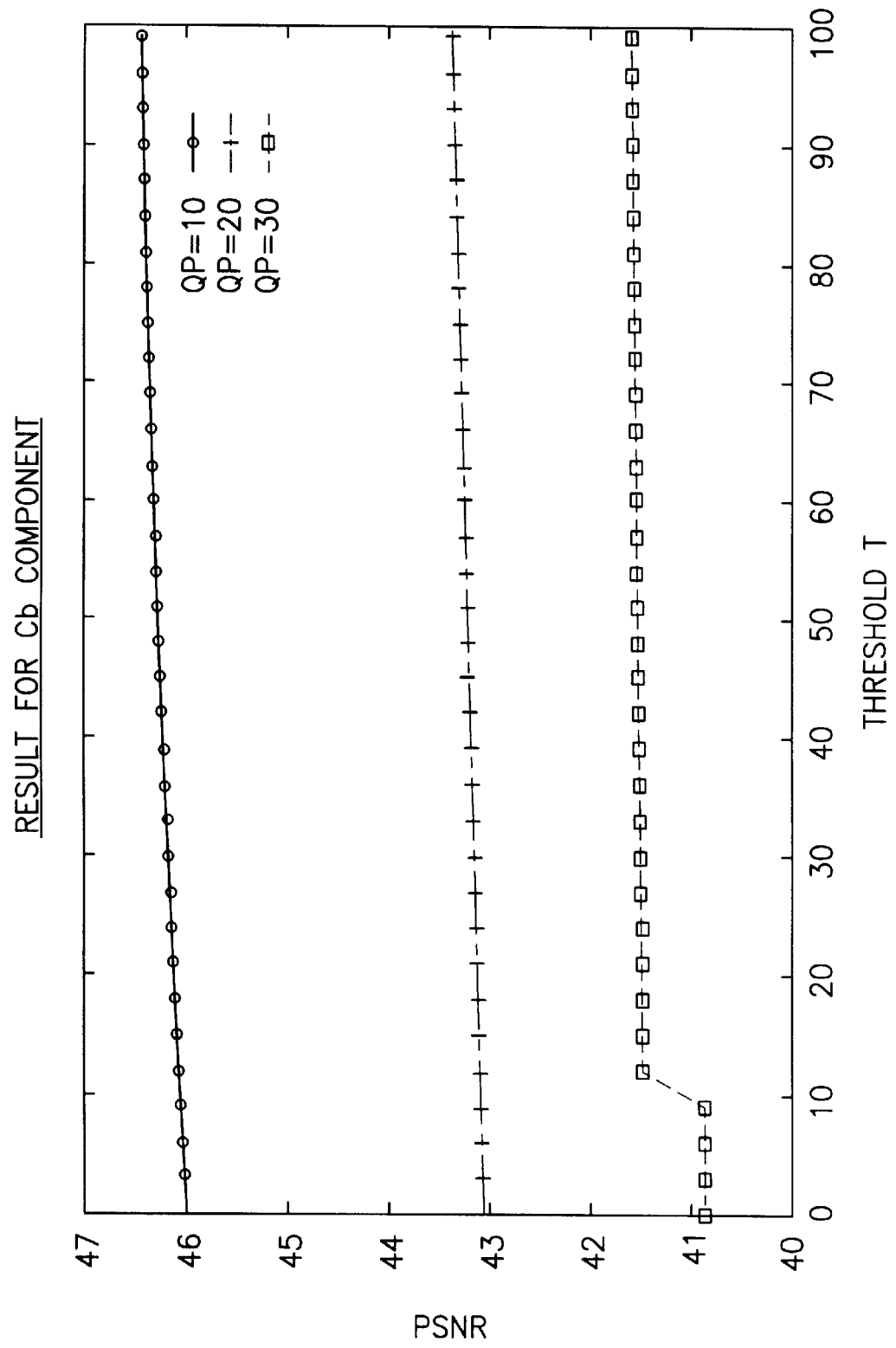
FIG. 9 illustrates simulation results of PSNR versus color threshold for the chrominance (Cb) component of an object in accordance with the present invention.
Figure 10:
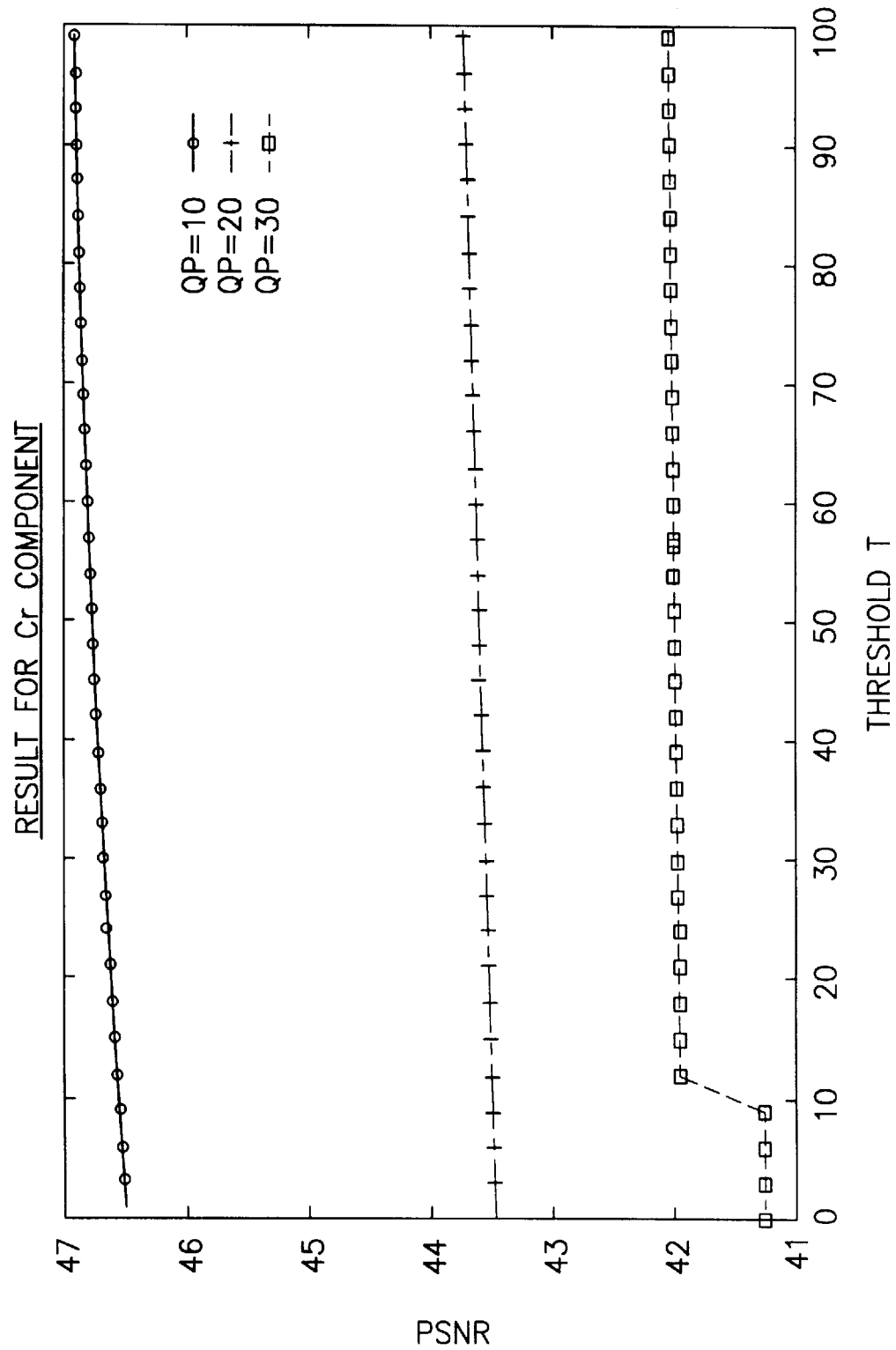
FIG. 10 illustrates simulation results of PSNR versus color threshold for the chrominance (Cr) component of an object in accordance with the present invention.

FIGS. 8–10 show simulation results from the MPEG "weather" test sequence for Y, Cb and Cr components, respectively using QP=10, 20 and 30. In these figures, T was incremented by three units for each trial. Accordingly, the resolution of each curve is three units. PSNR indicates peak signal-to-noise ratio in decibels (dB), where the color space components Y, Cb and Cr are the respective signals, and any deviation is the noise.

FIG. 8 illustrates simulation results of PSNR versus threshold for the luminance (Y) component of an object in accordance with the present invention.

For the largest quantization parameter (e.g., most coarse coding), QP=30, PSNR increases rapidly from T=9–12. Accordingly, to achieve a high PSNR with a small T, T=12 should be selected for color keying. For QP=20, PSNR increases rapidly from T=3–6. Accordingly, T=6 should be selected for color keying. For the smallest quantization parameter (e.g., finest coding), QP=10, PSNR does not exhibit any rapid increases as T varies, so T=0 should be selected for color keying.

Various procedures may be used to detect a rapid increase in PSNR. For example, T can be increased at fixed intervals, starting from zero, and the PSNR determined for each value of T. A rapid increase in PSNR indicates the optimum T. Alternatively, the slope of PSNR versus T may be examined, where a peak in the slope indicates the optimum T. A computational efficient procedure such as using the quantization error, Q, is preferred, in particular, for real-time encoding and transmission.

FIG. 9 illustrates simulation results of PSNR versus threshold for the chrominance (Cb) component of an object in accordance with the present invention. For QP=30, PSNR increases rapidly from T=9–12. Accordingly, to achieve a high PSNR with a small T, T=12 should be selected for color keying. For QP=20 and QP=10, PSNR does not exhibit any rapid increases as T varies, so T=0 should be selected for color keying.

FIG. 10 illustrates simulation results of PSNR versus threshold for the chrominance (Cr) component of an object in accordance with the present invention. For QP=30, PSNR increases rapidly from T=9–12. Accordingly, to achieve a high PSNR with the smallest T, T=12 should be selected for color keying. For QP=20 and QP=10, PSNR does not exhibit any rapid increases as T varies, so T=0 should be selected for color keying.

Tables 2–4 provide simulation results for a variety of existing keying threshold schemes for comparison with the keying threshold selection scheme of the present invention. The first column indicates the relevant parameter being set or measured. T1, T2 are lower and upper keying thresholds for a non-binary keying scheme. The second column provides PSNR results for T1=60, T2=70 threshold values as suggested in the aforementioned article to T. Chen et al. The third column provides PSNR results when using a big gap threshold.

The optimal T and corresponding PSNR in accordance with the present invention are shown in the fourth column. In most cases, an optimal PSNR is achieved by selecting an optimal T in accordance with the present invention. Moreover, the improvement relative to the T. Chen et al. technique is most pronounced for the luminance (Y) component.

Table 2, 3 and 4 show comparative results with QP=10, 20 and 30, respectively.

TABLE 2

| (QP = 10) | | | |
|---|---|---|---|
| T1, T2    | 60, 70  | −1981, 5304 | T = 0   |
| PSNR (Y)  | 35.3 dB | 26.2 dB     | 41.4 dB |
| PSNR (Cb) | 44.6    | 28.8        | 46.0    |
| PSNR (Cr) | 46.2    | 30.3        | 46.5    |

TABLE 3

| (QP = 20) | | | |
|---|---|---|---|
| T1, T2    | 60, 70  | −1490, 4031 | T = 6   |
| PSNR (Y)  | 34.2 dB | 28.0 dB     | 37.4 dB |
| PSNR (Cb) | 43.0    | 30.4        | 43.0    |
| PSNR (Cr) | 43.6    | 31.8        | 43.5    |

TABLE 4

| (QP = 30) | | | |
|---|---|---|---|
| T1, T2    | 60, 70  | −1441, 4028 | 12      |
| PSNR (Y)  | 33.2 dB | 27.6 dB     | 35.2 dB |
| PSNR (Cb) | 41.6    | 30.1        | 41.5    |
| PSNR (Cr) | 42.2    | 31.6        | 42.0    |

Generally, the experimental results show that the quality (e.g., PSNR) of the reconstructed video is better as the keying threshold, T, increases.

However, the performance is saturated once the threshold passes beyond a specific QP value. Beyond this QP value, the higher threshold can better locate a background object that is effected by color bleeding. However, this effect works against locating the object boundary since it may become closer to the key after color bleeding. Therefore, the optimum threshold T should be selected according to QP.

The proposed system is appropriate for a simple shape coding tool where low complexity and low bit rate are the most critical factors.

Accordingly, it has been seen that the present invention provides a chroma keying system that provides an optimized threshold for switching between background and foreground objects in a video picture. The chroma keying system is compatible with existing video standards such as MPEG-2, MPEG-4 and H.263+, and other frame-based video compression standards.

Moreover, the chroma keying system is computationally efficient and uses minimal overhead.

The chroma keying system is compatible with VOPs and other video objects and images.

Furthermore, a chroma key technique is provided for representing the shape of a video object, where the shape information (alpha plane) of a foreground object is embedded in the keyed output, so there is no need to carry an explicit alpha plane, or use alpha plane coding.

The chroma key shape representation technique provides a smooth transition at the boundary between objects without the need for special switching patterns, such as a general gray scale shape coding tool, or post-processing, e.g., using feathering filters.

Although the invention has been described in connection with various specific embodiments, those skilled in the art will appreciate that numerous adaptations and modifications may be made thereto without departing from the spirit and scope of the invention as set forth in the claims.

For example, while chroma keying for horizontal video lines was discussed in illustrated examples, the invention may be adapted for use with other linear or curved paths in a video picture.

Furthermore, the invention is equally suitable for use in transitioning from a background region to a foreground object, as from a foreground object to a background region.

What is claimed is:

1. A chroma keying method for encoding a transition between a first image region and a second image region in a line of a digital video picture, comprising the steps of:

cross fading pre-encoded key color data (K) of said first image region with color data of said second image region according to alpha plane information of said second image region to obtain a soft keyed output;

encoding said soft keyed output according to a first quantization parameter (QP) to obtain an encoded soft keyed output;

coding and decoding said pre-encoded key color data to obtain decoded key color data;

calculating a quantization error (Q) of said decoded key color data; and determining an optimum keying threshold (T) according to said first quantization parameter (QP) and said quantization error (Q).

2. The method of claim 1, wherein:

said coding and decoding of said pre-encoded key color data is responsive to said first quantization parameter (QP) used in said encoding step.

3. The method of claim 1, comprising the further step of:

calculating a range of quantization errors of said decoded key color data according to a corresponding range of quantization parameters;

storing data indicative of said range of quantization errors and said corresponding range of quantization parameters;

wherein said determining step is responsive to said storing step.

4. The method of claim 3, wherein:

said calculating and storing steps occur before said encoding of said soft keyed output.

5. The method of claim 1, comprising the further steps of:

transmitting the encoded soft keyed output, said optimum keying threshold (T), and said pre-encoded key color data (K) across a communication channel to a decoding function;

decoding the encoded soft keyed output at the decoding function to obtain a reconstructed soft keyed output; and recovering decoded alpha plane data and object pixel data of said second image region from said reconstructed soft keyed output in accordance with said optimum keying threshold (T) and said pre-encoded key color data (K).

6. The method of claim 5, comprising the further steps of:

determining a distance between said reconstructed soft keyed output and said pre-encoded key color data (K);

classifying the reconstructed soft keyed output as said second image region if said distance is greater than said optimum keying threshold (T); and classifying the reconstructed soft keyed output as said first image region if said distance is not greater than said optimum keying threshold (T).

7. The method of claim 1, wherein:

said alpha plane information of said second image region is embedded in the soft keyed output.

8. The method of claim 1, wherein:

said first image region comprises a background region and said second image region comprises a foreground object.

9. The method of claim 1, wherein:

said first image region comprises a foreground object and said second image region comprises a background region.

10. The method of claim 1, wherein said optimum keying threshold (T) is determined in said determining step by observing a measure of said quantization error (Q) for a range of keying thresholds at said first quantization parameter (QP).

11. The method of claim 10, wherein said measure is a peak signal-to-noise (PSNR) ratio of said pre-encoded key color data (K) to said quantization error (Q).

12. A chroma keying method for decoding a transition between a first image region and a second image region in a line of a digital video picture, comprising the steps of:

receiving an encoded soft keyed output from a communication channel;

said encoded soft keyed output being obtained at an encoder by cross fading pre-encoded key color data (K) of said first image region with color data of said second image region according to alpha plane information of said second image region to obtain a soft keyed output, and encoding said soft keyed output according to a first quantization parameter (QP);

receiving optimum keying threshold data (T) and said pre-encoded key color data (K) from said communication channel;

said optimum keying threshold data (T) being obtained at said encoder by coding and decoding said pre-encoded key color data to obtain decoded key color data, calculating a quantization error (Q) of said decoded key color data, and determining said optimum keying threshold data (T) according to said first quantization parameter (QP) and said quantization error (Q);

decoding the encoded soft keyed output to obtain a reconstructed soft keyed output; and recovering decoded alpha plane data and object pixel data of said second image region from said reconstructed soft keyed output in accordance with said optimum keying threshold (T) and said pre-encoded key color data (K).

13. The method of claim 12, comprising the further steps of:

determining a distance between said reconstructed soft keyed output and said pre-encoded key color data (K);

classifying the reconstructed soft keyed output as said second image region if said distance is greater than said optimum keying threshold (T); and classifying the reconstructed soft keyed output as said first image region if said distance is not greater than said optimum keying threshold (T).

14. The method of claim 12, wherein:

said alpha plane information of said second image region is embedded in the soft keyed output.

15. The method of claim 12, wherein:

said first image region comprises a background region and said second image region comprises a foreground object.

16. The method of claim 12, wherein:

said first image region comprises a foreground object and said second image region comprises a background region.

17. A chroma keying apparatus for encoding a transition between a first image region and a second image region in a line of a digital video picture, comprising:

a cross fader;

an encoder coupled to receive an output of said cross fader;

a coder/decoder (codec);

a subtractor coupled to receive an output of said codec; and an optimum threshold processor coupled to receive an output of said subtractor; wherein said cross fader is adapted to cross fade pre-encoded key color data (K) of said first image region with color data of said second image region according to alpha plane information of said second image region to obtain a soft keyed output;

said encoder is adapted to encode said soft keyed output according to a first quantization parameter (QP) to obtain an encoded soft keyed output;

said codec is adapted to code and decode said pre-encoded key color data to obtain decoded key color data;

said subtractor is used to calculate a quantization error (Q) of said decoded key color data; and said optimum threshold processor is used to determine an optimum keying threshold (T) according to said first quantization parameter (QP) and said quantization error (Q).

18. The apparatus of claim 17, wherein:

said codec is responsive to said first quantization parameter (QP) for coding and decoding said pre-encoded key color data.

19. The apparatus of claim 17, wherein:

said codec is adapted to code and decode said pre-encoded key color data according to a range of quantization parameters to obtain a corresponding range of decoded key color data;

said subtractor is used to calculate a range of quantization errors of said range of decoded key color data;

further comprising:

a memory for storing data indicative of said range of quantization errors and said corresponding range of quantization parameters;

wherein said optimum threshold processor is responsive to said memory for determining said an optimum keying threshold (T).

20. The apparatus of claim 19, wherein:

said codec codes and decodes said pre-encoded key color data according to said range of quantization parameters; and said subtractor is used to calculate said range of quantization errors before said encoder encodes said soft keyed output.

21. The apparatus of claim 17, further comprising:

a transmitter;

a decoding function for receiving an output of said transmitter;

said decoding function comprising a decoder, and a threshold function for receiving an output of said decoder; wherein:

said transmitter transmits the encoded soft keyed output, said optimum keying threshold (T), and said pre-encoded key color data (K) across a communication channel to said decoding function;

said decoder decodes the encoded soft keyed output to obtain a reconstructed soft keyed output; and said threshold function recovers decoded alpha plane data and object pixel data of said second image region from said reconstructed soft keyed output in accordance with said optimum keying threshold (T) and said pre-encoded key color data (K).

22. The apparatus of claim 21, wherein said threshold function:

determines a distance between said reconstructed soft keyed output and said pre-encoded key color data (K);

classifies the reconstructed soft keyed output as said second image region if said distance is greater than said optimum keying threshold (T); and classifies the reconstructed soft keyed output as said first image region if said distance is not greater than said optimum keying threshold (T).

23. The apparatus of claim 17, wherein:

said alpha plane information of said second image region is embedded in the soft keyed output.

24. The apparatus of claim 17, wherein:

said first image region comprises a background region and said second image region comprises a foreground object.

25. The apparatus of claim 17, wherein:

said first image region comprises a foreground object and said second image region comprises a background region.

26. The apparatus of claim 17, wherein said optimum threshold processor determines said optimum keying threshold (T) by observing a measure of said quantization error (Q) for a range of keying thresholds at said first quantization parameter (QP).

27. The apparatus of claim 26, wherein said measure is a peak signal-to-noise (PSNR) ratio of said pre-encoded key color data (K) to said quantization error (Q).

28. A chroma keying apparatus for decoding a transition between a first image region and a second image region in a line of a digital video picture, comprising:

a decoding function for receiving an encoded soft keyed output from a communication channel;

said decoding function comprising a decoder, and a threshold function for receiving an output of said decoder; wherein:

said encoded soft keyed output is obtained at an encoder by cross fading pre-encoded key color data (K) of said first image region with color data of said second image region according to alpha plane information of said second image region to obtain a soft keyed output, and encoding said soft keyed output according to a first quantization parameter (QP);

said threshold function receives optimum keying threshold data (T) and said pre-encoded key color data (K) from said communication channel;

said optimum keying threshold data (T) is obtained at said encoder by coding and decoding said pre-encoded key color data to obtain decoded key color data, calculating a quantization error (Q) of said decoded key color data, and determining said optimum keying threshold data (T) according to said first quantization parameter (QP) and said quantization error (Q);

said decoder decodes the encoded soft keyed output to obtain a reconstructed soft keyed output; and said threshold function recovers decoded alpha plane data and object pixel data of said second image region from said reconstructed soft keyed output in accordance with said optimum keying threshold (T) and said pre-encoded key color data (K).

29. The apparatus of claim 28, wherein said threshold function:

determines a distance between said reconstructed soft keyed output and said pre-encoded key color data (K);

classifies the reconstructed soft keyed output as said second image region if said distance is greater than said optimum keying threshold (T); and classifies the reconstructed soft keyed output as said first image region if said distance is not greater than said optimum keying threshold (T).

30. The apparatus of claim 28, wherein:

said alpha plane information of said second image region is embedded in the soft keyed output.

31. The apparatus of claim 28, wherein:

said first image region comprises a background region and said second image region comprises a foreground object.

32. The apparatus of claim 28, wherein:

said first image region comprises a foreground object and said second image region comprises a background region.

* * * * *